April 18, 1961 C. B. STOKER, JR 2,980,245
CONTAINER, PACKAGE, AND MANUFACTURE OF PACKAGE
Filed July 16, 1959 2 Sheets-Sheet 1

*INVENTOR.*
CARL B. STOKER, JR.
BY
*J. B. Holden*
ATTORNEY

April 18, 1961   C. B. STOKER, JR   2,980,245
CONTAINER, PACKAGE, AND MANUFACTURE OF PACKAGE
Filed July 16, 1959   2 Sheets-Sheet 2
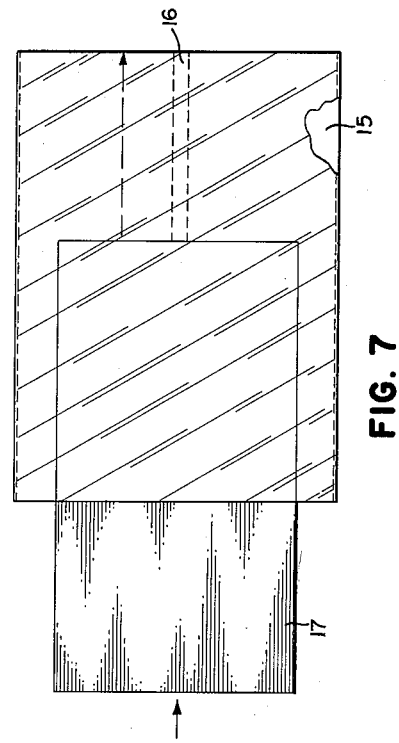
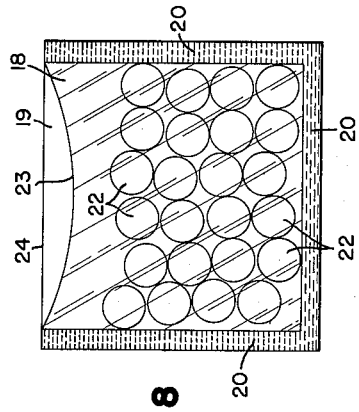
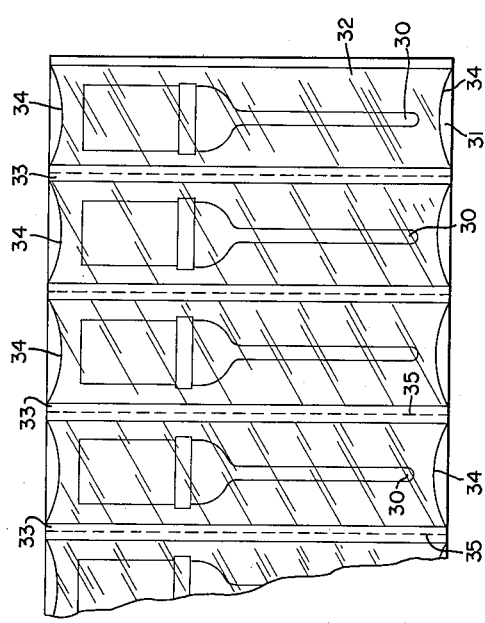
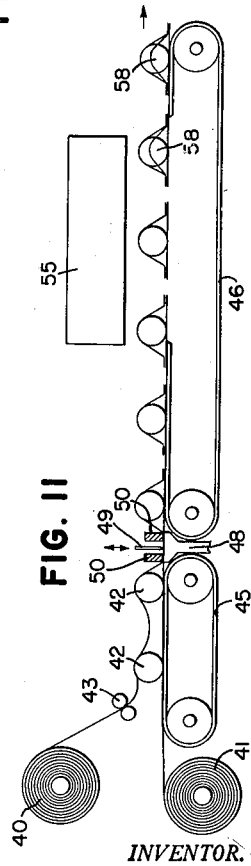
INVENTOR.
CARL B. STOKER, JR.
BY J. B. Holden
ATTORNEY

United States Patent Office 2,980,245
Patented Apr. 18, 1961

2,980,245

CONTAINER, PACKAGE, AND MANUFACTURE OF PACKAGE

Carl B. Stoker, Jr., Akron, Ohio, assignor to The Goodyear Tire & Rubber Company, Akron, Ohio, a corporation of Ohio Filed July 16, 1959, Ser. No. 827,474

2 Claims. (Cl. 206—46)

This invention relates to a new form of container and package, and the manufacture of the package.

The container is very simple in its construction. It is made from a cover film and a stiff, bendable cellulosic backing. The film is comprised of ethylene terephthalate-ethylene isophthalate and forms a strong heat-sealed bond directly with the backing so no adhesive is used, and this greatly simplifies the manufacture of the container. The film is a stretched film, and the package is closed by heating the film whereby it shrinks down over the package contents.

The film makes what is known as a "fiber-tear" bond with the cellulosic fibers of the backing. A "fiber-tear" bond is a bond which adheres so tightly to a fibrous material that it cannot be broken without tearing fibers from the material. The bond is formed by simply pressing the film to the stiff backing which is chipboard, cardboard or the like, using sufficient heat to seal the film to the backing. After the seal has cooled to room temperature, the two cannot be separated by pulling them apart without destruction of the backing because of the union of the film to the backing. The film may be united to other backings such as those coated with foil or paper and the like and even to backings of plastic, wood, polyurethane, fabric, etc., but an uncoated cellulose backing, i.e., one which is substantially homogeneous throughout and composed mostly of cellulosic fibers has the widest application and is preferred.

Although the film has been described as an ethylene terephthalate-ethylene isophthalate copolyester, a laminate thereof with another heat-shrinkable material may be used. The film is stretched either in one direction or in mutually perpendicular directions, so that when the film is heated after the container is made, it shrinks down on to the object or objects in the container. If the film be a laminate, the copolyester film surface is left exposed where the film is to be bonded to the backing. The lamina may be a film of a vinyl polymer, vinyl-vinylidene copolymer, polyethylene, rubber hydrochloride or other transparent plastic which is capable of being stretched and subsequently shrinking when the film to which it is laminated is shrunk. In the most usual form of such laminate only the outer surface of the film is covered. Instead of covering one entire surface and leaving the other entire surface exposed, one surface may be covered in part only, leaving exposed the areas which are united to the backing; and the other surface may be covered or be left exposed. Thus, if the package is to be made by uniting opposite edges of a film to a backing, the surface of the film which is to be united to the backing may be covered up to the areas along its respective edges which are to be united to the backing.

It is unnecessary to describe the method of producing the copolyester or the film because these are described in detail in British Patent 766,290 of The Goodyear Tire and Rubber Company. Copolyester which contains too much ethylene terephthalate becomes brittle when united to the backing by heat, and such films are not included herein. The film of this invention contains 15 to 75 percent of ethylene terephthalate and 85 to 25 percent of ethylene isophthalate, or preferably 50 to 75 percent of the former and 50 to 25 percent of the latter. The preferred film is composed of substantially 60 percent ethylene terephthalate and 40 percent ethylene isophthalate. Generally the film will be no thicker than 0.001 or 0.002 inch, and ordinarily less than 0.001 inch, e.g. 0.0002 or 0.0008 inch, and in laminates the thinner film is preferred.

The container of this invention may be a sleeve or it may be closed on three sides or all sides. The backing and the film are both generally rectangular, with the area of the film somewhat greater than the area of the backing to permit the object or objects to be packaged between the film and the backing. The film is often wide enough to permit its opposite edges to be folded over the edges of the backing and bonded to its back side. Seals formed in this way are more difficult to separate from the backing by a straight pull away from the backing than film sealed to the front of the backing. If the container is a sleeve the backing may be longer than the film, and the portions extending beyond the film may be of any shape. If the film is sealed on three sides to form a bag-like structure, the film may be sufficiently larger than the backing to be folded over its bottom and side edges and sealed to the back of the backing. If all edges of the film are sealed to the backing, the film may be sealed to the back of the backing, or the outer area of the film may be sealed flat against the front of the backing. The film itself may be in the form of a sleeve, with the backing slipped into it and sealed against one-half of the sleeve by heat.

The container is made from stretched film. If the film is a laminate, the other lamina or laminae are united to the copolyester film before stretching. The film may be stretched in one direction only, and this is often desirable, particularly when the container is a sleeve. Such stretching may be accomplished by extrusion of the copolyester or by any usual means for stretching.

Films of many plastics after being stretched and then shrunk are quite easily stretched again. The stretched film of this invention takes a set on shrinking and has a high tensile strength so that it holds tight against the contents of the package and is not easily stretched again without heating. It is this property of the film, together with its great adhesion to cellulosic materials, that makes it particularly adapted for use in the types of packages to which the invention relates. The backing sheet employed in the package is stiff enough so that when the film has shrunk, the backing holds it taut against the contents of the package, and the backing is preferably flexible enough so that its edges are bent somewhat toward one another when the film has shrunk. If a stiff material is packaged, the backing itself need not be so stiff.

When film stretched in only one direction is used, and opposite edges of the film are bonded to the backing, the direction of stretch is in the direction of these opposite edges. Then on subsequent heating, as the film shrinks it is drawn down tight over the contents of the package. It shrinks primarily in the direction in which it has been stretched, but also may shrink perpendicularly thereto.

The shrinking is preferably sufficient to bend the edges of the backing toward one another, and if the objects to be packaged are rounded, as oranges, eggs, etc., the central portion of the backing may be rounded to the general shape of the contents of the package. If only two edges of the film are sealed to the backing, the other two edges draw away from the mouths of the sleeve as it shrinks, and hold the contents in the package, as illustrated in the drawings.

If the cover film be adhered to the backing along three edges the edge of the film at the open edge or mouth of the container will draw away from the mouth, as the film shrinks. Ordinarily in such a bag-like structure, it is only necessary to have the film stretched in the direction of the side seals. If the film be stretched in both directions, the stretch across the bag may be the same as, or greater than the stretch from the mouth to the bottom of the bag.

The film is stretched to a greater or less extent depending upon the amount of subsequent shrinking desired. If the entire edge of the film is not sealed to the backing, but at least one mouth is left open, the film is stretched sufficiently so that on subsequent heating the film at the mouth or mouths of the package is shrunken sufficiently to partially close the mouth over the object so that the object is held in the package. Thus, the package is closed by simple heating, without need for any application of pressure to any prescribed area to form a seal, and without application of adhesive to the backing or film. If the packaged object is thick so that it holds the covering portion of the film far from the backing, greater shrinking is usually provided because more shrinkage is possible than if the packaged object is flat. However, the amount of shrinkage will depend upon how much the film has been stretched, how much the backing is bent in the finished package, how tight the film can be shrunk against the package contents and whether the contents are relatively uniform in outline or vary greatly, etc.

If the film is stretched in only one direction, it may be stretched to only twice its original area. If stretched in mutually perpendicular directions, it may be stretched as little as 100 percent in one direction and enough in the other direction to give the desired shrinkage on subsequent heating. For instance, it may be stretched equally in both directions to four, nine, sixteen, or twenty-five times its original area.

The invention will be further described in connection with the accompanying drawings, in which—

Fig. 7 is a plan view of a sleeve type of package with an object being inserted in it;

Fig. 8 is a side view of a package in which a film cover is fastened to three edges of the backing to form a bag-like container;

Fig. 10 is a plan view of a plurality of paint brushes packaged in separate sleeves; and Fig. 11 is a schematic side view of equipment for making a package.

Figure 1:
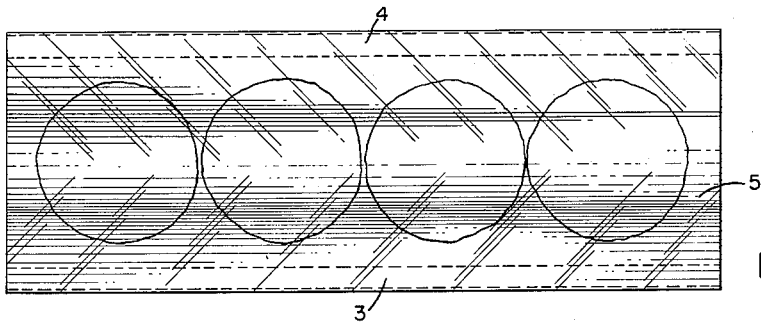
Fig. 1 is a top view of a package showing four oranges on a stiff backing covered with film before heating.

The package of Figures 1 to 5 is made of a stiff, bendable cellulosic backing 1 which may be chipboard, cardboard, or the like. It is uncoated. The edges 3 and 4 of the transparent film 5 are turned under the backing and heat sealed directly to its bottom surface. The film is preferably composed entirely of ethylene terephthalate-ethylene isophthalate copolyester (60:40), but the content of ethylene terephthalate may be as much as 75 percent and the film may have one or more heat-stretchable and shrinkable plies laminated to it. The film whether laminated or not is, for instance 0.0002 to 0.0008 inch thick before shrinking. For this package the film is preferably stretched in two directions to about nine times its unstretched area. No adhesive is employed to bond the film to the backing. The two are bonded directly to one another by pressing them together for a time and temperature sufficient to form a good heat seal.

Figures 2, 3:
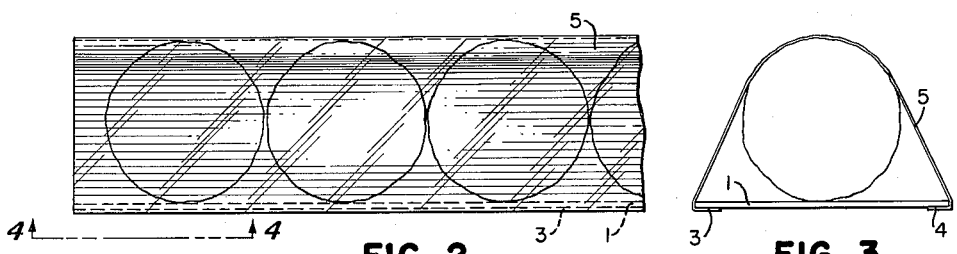
Fig. 2 is a side view of the same.
Fig. 3 is an end view of the same.
Figure 4:
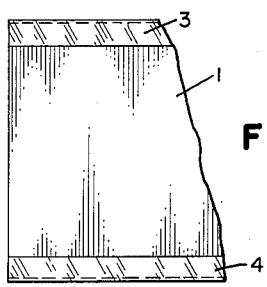
Fig. 4 is a bottom view of one end of the package on the line 4—4 of Fig. 2.
Figure 5:
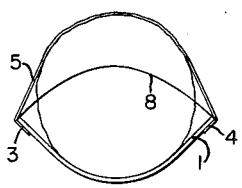
Fig. 5 is an end view of the package after heating.

The oranges 6 are packaged in any suitable way. The containers made of the film and backing may be shipped to the packager so that all that must be done where the oranges are packaged, is to insert the oranges between the film and the backing, as shown in Figures 1 to 3, and then heat this package. Supplying this type of sleeve, minimizes the operations which the packager must perform, and the only equipment required is suitable heating means. This may be an oven or it may be merely be heating means directed on to a suitable support or conveyor. It may merely be a hot blast of air. Any suitable heating means may be utilized. On heating, the film shrinks and is drawn tightly against the top of the oranges and as it does so it bends the edges of the backing 1 up around the bottoms of the oranges as illustrated in Fig. 5. In shrinking, the film is drawn down between the several oranges and over the end surfaces of the terminal oranges in the package, as at 8 in Fig. 5. This holds the oranges together and prevents their falling out of either end of the package no matter how the package is held.

This package provides a convenient means for marketing a single object or a plurality of objects as, for example, in a supermarket. It protects the products while it displays almost their entire surfaces to inspection by the prospective purchaser. Many products lend themselves to such packaging, such as fruits, vegetables and manufactured articles. The package protects the products from most of the objectionable disadvantages produced by handling by prospective customers. It saves counting out the products in the market place; the counting out being done more efficiently by trained labor or machinery in a regular packaging assembly line. The packages can be displayed in any suitable manner, as by hanging from one end, by laying the packages side-by-side on a counter, by jumbling the packages promiscuously in a container, or in any other desirable manner. The packages may be of any desired length, and may be much longer than desired for a single package, in which case desired lengths are cut off from time to time as required by the customers.

The film used in the package illustrated in Figs. 1–5 may be composed entirely of copolyester film. Alternatively, it may be a laminate. If a laminate, the lamination is made before the copolyester film is stretched. There is no particular product advantage in using a laminated film for oranges. Lamination is desirable where different surface properties are required in the film or where the permeability of the film must be changed or where it must be made resistant to contact by some material detrimental to the copolyester. Other factors to be taken into consideration in determining whether to use a single-ply film or a laminate are cost, coloring or printing, strength of shrinkage required, tear strength, permitted elongation, etc.

The film used in packages, as illustrated in Figs. 1–5, is only a small fraction of a thousandth of an inch thick in the stretched condition. Using a backing material 3½ inches wide by 9 inches long and packaging three oranges 3 inches in diameter, a film 8 inches by 9 inches and stretched in two directions to 900 percent of its original area can be used to advantage. Such film is readily sealed directly to chipboard or the like with a sealing jaw pressure of about 60 to 70 pounds per square inch heated to 167° C. for example, with pressure applied for only ½ second. The film forms a fiber-tear bond, and no adhesive is used. On heating the film of the container with oranges in it, with a hot-air blast, to a temperature of about 100° C., this film shrinks quickly down over the oranges and holds them in tight contact with one another. The film will shrink as much as 40 percent of its stretched area depending upon whether it is in contact with an object or not. The condition of the surface of the object may or may not allow slippage of the film over it as it shrinks. Generally speaking, the longer the heat is applied, the more the film will shrink.

Figure 6:
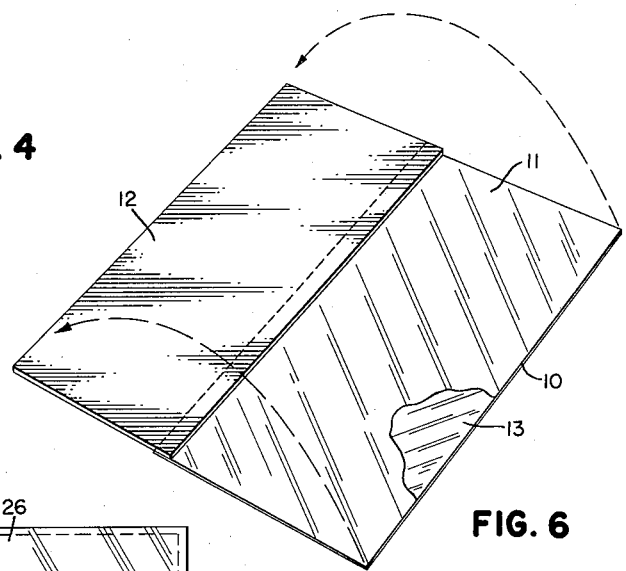
Fig. 6 shows film fastened to one edge of a stiff backing.

Figures 6 and 7 show two different ways of forming a sleeve package. In Fig. 6 the edge 10 of the laminated film 11 is fastened to the back of the stiff cellulose backing 12. The copolyester ply of the film is broken away to show a lamina 13 of rubber hydrochloride film or other suitable stretched lamina. This assembly is shipped to the packaging plant. Here the object or objects to be packaged are placed on the backing 12. The film 11 is then brought over this material to be packaged and its edge is heat sealed to the opposite edge of the backing either on its front or back. Thus the sleeve may be formed over the object or objects to be packaged. Alternatively, of course, the backing and film can be separately supplied to the packager; and then the material to be packaged is placed on the backing, the film is spread over it, and then opposite edges of the film (or even three or four edges) are heat sealed directly to the backing. The edges of the film may be sealed either to the front or the back of the backing sheet.

In Fig. 7 the container is made of a stiff cellulosic backing 15 which is contained in a sleeve of the copolyester (60:40) film. The edges of the sleeve are shown as overlapped and sealed to one another in the area 16. The portion of the sleeve covering the back of the backing material may be united to the backing by heat before the object 17 to be packaged is placed in the container. Alternatively, the film need not be fastened to the backing until after the object to be packaged has been inserted in it. In fact, the object 17 to be packaged might be placed on the stiff backing 15 before it is inserted in the film. If the package is used for a plurality of objects, these may be fastened individually to the backing. On heating, the film shrinks around the object 17.

Where the packaged material is relatively flat, as illustrated in Fig. 7, if the film has not shrunken sufficiently to bend the backing, the packaged material can be slipped out (or partially out) of the finished package for inspection by bending the backing enough to permit this. Even when the backing is bent in the final package, it may be bent somewhat more to permit temporary removal from the package for inspection.

Figure 8 illustrates a bag. The film 18 before stretching is somewhat larger than the stiff backing 19 so as to provide space for insertion of an object between the two. The film is sealed to three sides of the backing in the area 20. The package contains a plurality of objects 22 such as thick, round buttons, or the like. After putting these in the bag, the film is shrunk down on to them. Whether the film used be stretched in one direction or in mutually perpendicular directions on heating its edge 23 shrinks away from the edge 24 of the backing at the mouth, and it shrinks down over the outer edge of the packaged object and holds it in place. The preferred film for such a bag is copolyester (60:40) stretched in both directions.

Figure 9:
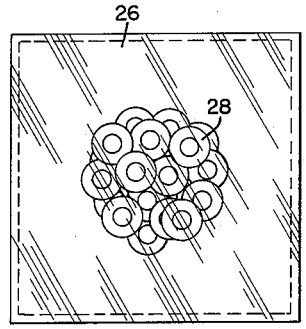
Fig. 9 is a top view of an object between a film and the backing with the film sealed to the backing in an area which surrounds the object.

Figure 9 shows a modified type of package in which the film 26 covers the top of the backing and is sealed to either the front or the back of the backing along all four edges, by heat and pressure. The object 28 of irregular shape is placed on the backing before the film is sealed to the backing. After the package has been assembled as shown, it is heated to shrink the film down on to the object. As the film shrinks down tight onto the object, it bends the edges of the backing up.

The film and backing need not be rectangular as illustrated. Both may be round or any other shape, and the film need not extend to the edge of the backing. The backing may protrude a considerable distance beyond the mouth of the bag.

Figure 10 shows a different type of sleeve package in which a number of objects such as the paint brushes 30 are packaged between a stiff backing sheet 31 and the stretched film covering 32. The film may be united to the areas 33 of the backing before the container is received at the place where the brushes are packaged. With such a package it is only necessary for the packager to slip the brushes into the individual sleeve pockets, and then heat the package to shrink the film down tight against the brushes. The film is copolyester (60:40) film stretched to nine times its original area. It may be a single ply film or laminated. When heated, the film shrinks laterally of the brushes and also longitudinally as indicated by the fact that at the mouth edges 34 of the individual packages the film is drawn away from the edge of the backing. When the film is united to the backing, both the film and the backing may be perforated along the lines 35 to facilitate separation of the various units if they are sold individually instead of in a strip.

A preferred method of producing the package on a production basis is illustrated schematically in Figure 11. The film which is preferably ethylene terephthalate—ethylene isophthalate (60:40)—but may be any of the film or film laminates described—is delivered from the roll 40, and the backing (which may be chipboard or other backing described) is delivered from the roll 41. These rolls are driven at speeds to supply the film faster than the backing so that it can be festooned over the articles 42, which may be of any shape. Conventional means is utilized for supplying the backing and film and laying the film over the articles, such as driven pinch rollers, etc., indicated at 43. The backing rests on the conveyor 45, which is driven at the same speed as the backing is supplied. The conveyor 46 travels somewhat faster to separate the individual packages.

Between the two conveyors is the table 48. The knife 49 and heat sealers 50 are reciprocated vertically and their action is timed so that they operate together between each two film-covered objects as they are delivered on the backing by the conveyor 45. As the knife cuts through the film and backing the heat sealers seal the film to the backing on both sides of each object. Conventional means is provided for bringing the film into contact with the backing and preventing the heat sealers from contacting the film before it is drawn close to the backing.

After sealing the film to the backing over the objects, the conveyor carries the packages under the heat source 55. This may be enclosed in a chamber through which the conveyor passes. The heat shrinks the film down over the ends of the object at 58, and holds the object in the package.

The important feature of the invention is the adhesion of the film directly to the backing by heat and the setting of the copolyester film in its shrunk dimensions. Many modifications in the design of the package and container are possible, and in the method of making the same.

The invention is covered in the claims which follow.

What I claim is:

1. A package composed of an object, a stiff, bendable, rectangular backing bent over one surface of the object and transparent cover film adhered directly to the backing only at areas at opposite edges of the backing whereby a sleeve with mouths at opposite ends thereof is formed, said areas being closer to one another than if the backing were not bent, the ends of the object being located a substantial distance from the respective ends of the backing, the backing being substantially homogeneous in composition and composed mostly of cellulosic fibers, the film being copolyester of substantially 60 percent ethylene terephthalate and 40 percent ethylene isophthalate, and the film being taut and holding the backing bent, and being in tight contact with a surface of the object and at the mouths of the sleeve being shrunken away from the ends of the backing and drawn down over said ends of the object and holding it in the package.

2. That step in the process of packaging an object between a stiff, bendable backing and a heat-shrinkable cover film, opposite edges of the film being adhered directly to opposite edges of the backing, the backing being substantially homogeneous and composed mostly of cellulosic fibers, and the film being copolyester of substantially 60 percent ethylene terephthalate and 40 percent ethylene isophthalate, which step comprises heating the film while the object is between it and the backing, with the ends of the backing extending a substantial distance beyond the respective ends of the object, and by such heating shrinking the film against the object and thus shrinking it sufficiently to bend the edges of the backing toward each other and drawing the ends of the film down over the ends of the object.

References Cited in the file of this patent

UNITED STATES PATENTS

| | | |
|---|---|---|
| 1,201,470 | Johnson | Oct. 17, 1916 |
| 1,269,707 | Henderson | June 18, 1918 |
| 2,719,100 | Banigan | Sept. 27, 1955 |
| 2,865,765 | Allen | Dec. 23, 1958 |
| 2,892,747 | Dye | June 30, 1959 |
| 2,898,714 | Keith | Aug. 11, 1959 |
| 2,904,943 | Dreyfus et al. | Sept. 22, 1959 |